United States Patent
Farkash et al.

(10) Patent No.: US 9,918,111 B2
(45) Date of Patent: Mar. 13, 2018

(54) SYSTEM AND METHOD FOR SIMULTANEOUSLY RECORDING MULTIPLE MEDIA ASSETS USING A SINGLE TUNER

(71) Applicant: Cisco Technology, Inc., San Jose, CA (US)

(72) Inventors: Eyal Farkash, Raanana (IL); Kevin Murray, Fordingbridge (GB); Eliphaz Hibshoosh, Tel Aviv (IL); Aliza Itzkowitz, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 14/412,680

(22) PCT Filed: Jul. 1, 2013

(86) PCT No.: PCT/IB2013/055397
§ 371 (c)(1),
(2) Date: Jan. 5, 2015

(87) PCT Pub. No.: WO2014/006558
PCT Pub. Date: Jan. 9, 2014

(65) Prior Publication Data
US 2015/0163529 A1    Jun. 11, 2015

(30) Foreign Application Priority Data

Jul. 3, 2012  (GB) .................................. 1211750.3

(51) Int. Cl.
*H04N 5/765*     (2006.01)
*H04N 21/2343*   (2011.01)
(Continued)

(52) U.S. Cl.
CPC ............... *H04N 21/234327* (2013.01); *H04N 21/23608* (2013.01); *H04N 21/4347* (2013.01);
(Continued)

(58) Field of Classification Search
CPC ............................................ H04N 21/234327
See application file for complete search history.

(56) References Cited

U.S. PATENT DOCUMENTS 5,193,009 A  3/1993 Park
6,633,982 B1 10/2003 Kurzeja
(Continued)

FOREIGN PATENT DOCUMENTS

GB    2462732      11/2010
WO   2007047410    4/2007
WO   2010144221   12/2010

OTHER PUBLICATIONS

GB Combined Search and Examination Report, dated Dec. 19, 2012.
International Search Report, dated Oct. 31, 2013.

*Primary Examiner* — Hung Dang
*Assistant Examiner* — Girumsew Wendmagegn
(74) *Attorney, Agent, or Firm* — Samuel M. Katz

(57) ABSTRACT

A method for facilitating multiple recordings via a single tuner includes isolating data packets associated with recording candidate media assets from at least two broadcast data streams, generating at least one broadcast recording data stream from a subset of the isolated data packets, broadcasting the at least one broadcast recording data stream in parallel with the at least two broadcast data streams, where the broadcast recording data stream is broadcast via at least one dedicated broadcast "recording" device, and the at least two broadcast data streams are broadcast via other broadcast devices, storing remaining data packets not included in the isolated data packets in broadband data segments, and transmitting the broadband data segments via an IP connection to facilitate reassembly of partially recorded the media assets, where the partially recorded media assets were (Continued)

recorded from the broadcast recording stream. Related methods and apparatus are also disclosed.

13 Claims, 8 Drawing Sheets

(51) Int. Cl.
*H04N 21/44* (2011.01)
*H04N 21/462* (2011.01)
*H04N 21/61* (2011.01)
*H04N 21/845* (2011.01)
*H04N 21/236* (2011.01)
*H04N 21/434* (2011.01)
*H04N 21/8547* (2011.01)

(52) U.S. Cl.
CPC ... *H04N 21/44016* (2013.01); *H04N 21/4622* (2013.01); *H04N 21/6125* (2013.01); *H04N 21/8456* (2013.01); *H04N 21/8547* (2013.01)

(56) References Cited

U.S. PATENT DOCUMENTS

| | | |
|---|---|---|
| 7,917,008 B1 | 3/2011 | Lee et al. |
| 2001/0033343 A1 | 10/2001 | Yap et al. |
| 2003/0219228 A1 | 11/2003 | Thiagarajan et al. |
| 2006/0051051 A1 | 3/2006 | Kim |
| 2008/0089671 A1 | 4/2008 | Lang et al. |
| 2008/0216119 A1* | 9/2008 | Pfeffer .................. H04N 5/76 725/40 |
| 2011/0271306 A1* | 11/2011 | Kahn .................. H04N 7/162 725/68 |

* cited by examiner

SYSTEM AND METHOD FOR SIMULTANEOUSLY RECORDING MULTIPLE MEDIA ASSETS USING A SINGLE TUNER

The present application is a § 371 submission of International Application No. PCT/IB2013/055397, which was filed on Jul. 1, 2013, which was published in the English language on Jan. 9, 2014 with publication number WO 2014/006558, and which claims the benefit of the filing date of GB 1211750.3, filed Jul. 3, 2012.

FIELD OF THE INVENTION

The present invention relates to facilitating the recording of broadcasted media assets.

BACKGROUND OF THE INVENTION

The following references are believed to represent the known state of the art:
Robert N. Lee; Interface for resolving recording conflicts with network devices, U.S. Pat. No. 7,917,008 B1 Mar. 2011;
U.S. Pat. No. 5,193,009 "Signal switching method of a TV-VCR combination having two tuners" to Park;
US Patent Application 2001/0033343 "Multi-tuner DVR" of Yap;
US Patent Application 2006/0051051 "Combination recording apparatus for simultaneous recording and method thereof" of Kim;
US Patent Application 2008/0089671 "Simultaneous recording and playback of audio/visual programs" of Lang; and
GB Patent Application 2007/002153 "Peer-To-Peer Set-Top Box System" of Bachet, et al.

SUMMARY OF THE INVENTION

There is provided in accordance with some embodiments of the present invention a method for facilitating multiple recordings via a single tuner, the method including isolating data packets associated with recording candidate media assets from at least two broadcast data streams, generating at least one broadcast recording data stream from a subset of the isolated data packets, broadcasting the at least one broadcast recording data stream in parallel with the at least two broadcast data streams, where the broadcast recording data stream is broadcast via at least one dedicated broadcast "recording" device, and the at least two broadcast data streams are broadcast via other broadcast devices, storing remaining data packets not included in the isolated data packets in broadband data segments, and transmitting the broadband data segments via an IP connection to facilitate reassembly of partially recorded the media assets, where the partially recorded media assets were recorded from the broadcast recording stream.

Further, in accordance with some embodiments of the present invention, the generating includes assigning a broadcast/broadband ratio to each of the recording candidate media assets, where each broadcast/broadband ratio indicates a percentage of the isolated data packets from an associated recording candidate media asset to be included in the broadcast recording stream.

Still further, in accordance with some embodiments of the present invention, the broadcast/broadband ratios are at least one of uniform, prioritized and subject to manual input.

Additionally, in accordance with some embodiments of the present invention, the assigning includes initially defining at least one the broadcast/broadband ratio as %, and redefining the broadcast/broadband ratio with a lower value after an initial portion of its associated recording candidate media asset has been included in the broadcast recording data stream.

Moreover, in accordance with some embodiments of the present invention, the assigning includes accommodating the defining by temporarily assigning lower the broadcast/broadband ratios for other the recording candidate media assets included in the broadcast recording data stream until after the initial portion is complete.

Further, in accordance with some embodiments of the present invention, the assigning includes accommodating the defining by allocating dedicated bandwidth for broadcasting the initial portion.

Still further, in accordance with some embodiments of the present invention, the broadband data segments are stored in a different format than the broadcast data streams.

Additionally, in accordance with some embodiments of the present invention, the assigning includes defining allocation ratios for the subset of packets and the remaining packets in accordance with at least one of consumer recording requests and proportional distribution.

There is also provided in accordance with some embodiments of the present invention, A method for simultaneously recording multiple media assets, the method including designating at least one of n tuners on a media content recording device as a designated recording tuner, receiving at least n+1 tuning service requests on the media content recording device, where each tuning service request represents at least one of a recording request and a viewing request for media content on a different broadcast channel, tuning the designated recording tuner to receive a broadcast recording data stream from a dedicated broadcast "recording" device, where the broadcast recording stream includes a multiplicity of subsets of data packets, each of the subsets of data packets associated with one of a multiplicity of recording candidate media assets, recording at least two of the multiplicity of subsets of data packets as received from the dedicated broadcast recording device, where recording of the associated recording candidate media assets was requested in the at least n+1 tuning service requests, receiving data segments representing remaining the data packets associated with at least one of the recorded subsets of data packets, and assembling at least one of the multiplicity of recording candidate media assets from the at least one recorded subset and the data segments.

Further, in accordance with some embodiments of the present invention, the method includes starting a complete version recording of at least one of the recording candidate media assets from one of a multiplicity of "source" broadcast devices, where each of the source broadcast devices broadcasts complete versions of at least some of the recording candidate media assets, after receiving at least n+1 tuning service requests, saving the complete version recording as a partial full version recording, and performing tuning and recording, where at least one of the at least two of the multiplicity of subsets of data packets represents a subset of the at least one recording candidate media assets for which the complete version recording was started.

Still further, in accordance with some embodiments of the present invention, the assembling includes assembling the at least one of the multiplicity of recording candidate media assets from the at least one recorded subset, the data segments and the partial full version recording.

Additionally, in accordance with some embodiments of the present invention, the assembling also includes converting the data segments to a format compatible with the recorded subset.

There is also provided, in accordance with some embodiments of the present invention, a broadcast headend including a data stream generator to generate a multiplicity of data streams for broadcast, a cropping module to crop at least two of the multiplicity of data streams to generate at least a cropped broadcast stream and broadband data segments, where the cropped broadcast stream includes a subset of packets associated with at least two recording candidate media assets in the multiplicity of data streams, and the broadband data segments represent remaining packets associated with the recording candidate media assets and not included in the subset of packets, a broadcast uploader to upload at least the multiplicity of data streams and cropped broadcast stream to a broadcast satellite, where the cropped broadcast stream is uploaded to a dedicated broadcast "recording" device for broadcast as a broadcast recording stream, and a broadband transmitter to transmit the broadband data segments via an IP connection to a recording device configured to record packets associated with at least one of the recording candidate media assets in the broadcast recording stream, where the transmitted broadband data segments are associated with the at least one of the recording candidate media assets.

Further, the broadcast headend also includes a crop control module to at least define allocation ratios for the subset of packets and the remaining packets.

Still further, in accordance with some embodiments of the present invention, the broadcast headend also includes a broadband data segment storage unit to store the broadband data segments prior to transmission by the broadband transmitter, where the broadband data segment storage unit is configurable to store the broadband data segments in a different format than the data streams.

There is also provided, in accordance with some embodiments of the present invention, a media recording device including at least two tuners to tune the device to receive media asset broadcasts, where at least one of the tuners is configurable as a broadcast recording tuner to be tuned to a dedicated broadcast "recording" device, the dedicated broadcast recording device configurable to transmit a broadcast recording stream including a subset of packets associated with at least two recording candidate media assets generated from a multiplicity of data streams broadcast in parallel to the broadcast recording stream, a recorder to at least record a partial recording of at least one of the recording candidate media assets from the subset of packets, a broadband receiver to receive broadband data segments associated with the partial recording, where the broadband data segments are also generated from the multiplicity of data streams, and an assembly engine to assemble the at least one recording candidate media asset from at least the partial recording and the received broadband data segments.

Further, in accordance with some embodiments of the present invention, the assembly engine is configurable to convert the broadband data segments to a format compatible with the partial recording.

Still further, in accordance with some embodiments of the present invention, the dedicated broadcast "recording" device is a satellite transponder.

Additionally, in accordance with some embodiments of the present invention, the dedicated broadcast "recording" device is a cable frequency transmitter.

BRIEF DESCRIPTION OF THE DRAWINGS

The present invention will be understood and appreciated more fully from the following detailed description, taken in conjunction with the drawings in which.

DETAILED DESCRIPTION

Figure 1:
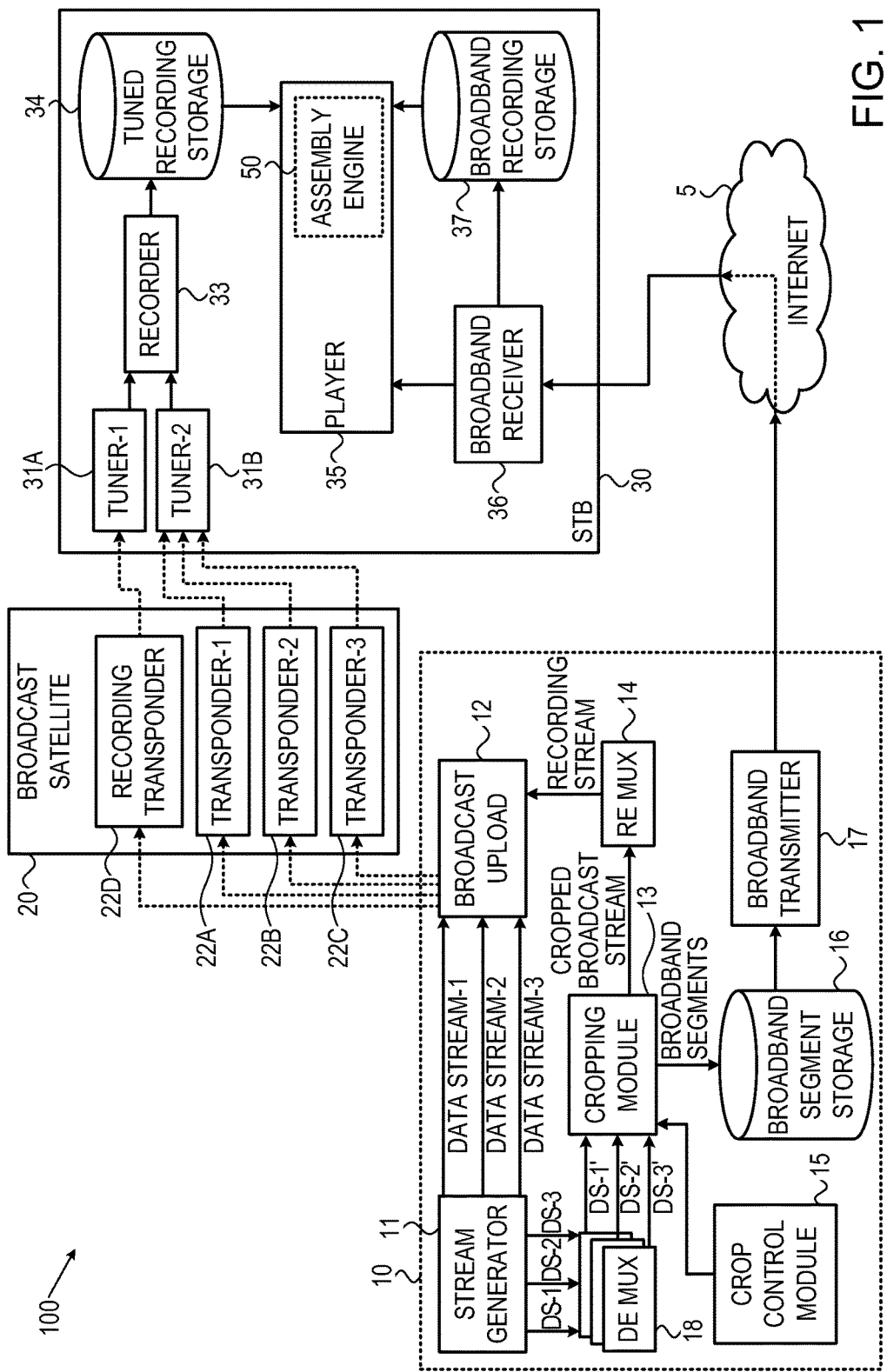
FIG. 1 is a schematic illustration of a novel broadcast media recording system, constructed and operative in accordance with an embodiment of the present invention.

In the following description, for purposes of explanation, numerous details are set forth, such as flowcharts and systems configuration, in order to provide an understanding of one or more embodiments of the present invention, However it is and will be apparent to one skilled in the art that those specific details are not required in order to practice the present invention.

Persons skilled in the art will appreciate that, throughout the present application, a set top box (STB) is used by way of example only, and that the present invention is not limited to a particular type of STB, but rather includes any suitable device with recording and playback functionality.

STBs may be configured with recording functionality that may be used to simultaneously record multiple television programs as they are broadcasted. Typically, an STB must be tuned to a broadcast transponder broadcasting the program being recorded. Accordingly, if the programs to be recorded are not being broadcast via the same transponder, the number of programs that may be recorded may be effectively limited by the number of tuners in a given STB. Therefore, depending on the circumstances, a dual-tuner STB may be capable of two simultaneous recordings, but not three or more. It will be appreciated that this limitation of tuners vs. simultaneous programs may also exist in homes/environments where a gateway may be used for the distribution of broadcast TV to IP-based clients. The maximum number of independent clients may be similarly limited by the number of tuners in the gateway.

It will be appreciated that transponders may typically be configured to broadcast multiple programs simultaneously in a single data stream. Accordingly, in some situations, a single tuner may facilitate the recording of multiple programs simultaneously, as long as all of the programs are broadcast via the same transponder. It may therefore be beneficial for a television service provider to broadcast the most popularly recorded programs via the same transponder. However, transponders may have limited bandwidth, such that it may not be feasible to include all, or even most, of the popularly recorded programs in a single transponder's data stream. To illustrate, a video bitrate of 1.2 mbps may be used for an exemplary standard definition (SD) quality broadcast and a 2.5 mbps video bitrate may be used for an exemplary high definition (HD) quality broadcast. A typical transponder may have bandwidth of 40 mbps which may therefore provide sufficient bandwidth for a maximum of 33 (33×1.2 mbps=39.6 mbps) SD programs, 16 HD programs (16×2.5 mbps=40 mbps), or some combination thereof, for example, 12 SD programs and 10 HD programs ((12×1.2 mbps)+(10× 2.5 mbps)=39.4 mbps). Therefore, depending upon the requirements of the television service provider, there may not be sufficient bandwidth to provide all of the desired programs in a single data stream. It will be appreciated that the use of the term television program is exemplary; the present invention may provide support for any program, media asset or service that may be typically provided by a television service provider.

STBs configured with IP connectivity are known in the art. Applicant has realized that such connectivity may be leveraged to increase the number of programs included in a given transponder's data stream by broadcasting a subset of each program as a "segmented broadcast" and delivering the remaining data segments as required via a broadband connection.

Reference is now made to FIG. 1 which illustrates a novel broadcast media recording system 100, constructed and operative in accordance with an embodiment of the present invention. The system 100 may comprise broadcast headend 10, satellite 20 and STB 30. It will be appreciated that system 100 may support a multiplicity of STBs 30. However, for the purposes of clarity only one STB 30 is illustrated in FIG. 1.

It will similarly be appreciated that additional functionality of system 100 that may be required to broadcast and/or receive media assets may not be depicted explicitly in FIG. 1. System 100 may comprise such functionality; however, in the interests of clearly pointing out the present invention, it may not be depicted in FIG. 1.

As will be described hereinbelow, system 100 may be configured to employ both over-the-air transmissions as well as broadband connections to deliver complimentary segments of a single television broadcast to subscribers for recording. It will be appreciated, however, that in accordance with an alternative embodiment of the present invention, system 100 may be configured to provide similar functionality via a cable based television broadcast system, where the associated cable bandwidth may be split between dedicated television broadcasts and IP broadband.

An exemplary broadcast satellite 20 may comprise four transponders 22 for receiving program data from headend 10 and then broadcasting it to customers using receiving apparatuses such as, for example, STB 30. Transponders 22 may be any standard transponders such as are known in the art. An exemplary system 100 may generally broadcast programs and services requiring up to 120 mbps of bandwidth, such that exemplary transponders 22A, 22B and 22C with 40 mbps bandwidth each may be sufficient for standard broadcast requirements. In accordance with some embodiments of the present invention, transponder 22D may be designated as a "recording transponder", to broadcast segmented broadcasts representing subsets of programs broadcast via transponders 22A, 22B and 22C to facilitate their recording by users of system 100.

It will be appreciated that the configuration of broadcast satellite 20 with four transponders 22 is exemplary; the present invention may support any configuration of at least n+1 transponders 22, where n=the number of transponders required to provide sufficient bandwidth to broadcast the programs and services of system 100. It will similarly be appreciated that if system 100 may be configured with a cable based television broadcast system, the functionality of satellite 20 and transponders 22 may be provided by cable television frequencies and channels.

Headend 10 may comprise stream generator 11 and broadcast uploader 12. Stream generator 11 may comprise known functionalities for generating data streams suitable for broadcasting television programs and services. For example, stream generator 11 may generate DVB data packets representing audio/video programs and services to be uploaded to satellite 20 via broadcast uploader 12. In an exemplary embodiment of the present invention, stream generator 11 may generate three such streams (data streams 1, 2 and 3) for simultaneous broadcast. It will, however, be appreciated that the number of data streams to be generated may be configurable; the present invention may support other configurations as required by a given television service provider. Each data stream may be associated with a specific transponder 22; for example, data stream 1 may be associated with transponder 22A, data stream 2 with transponder 22B and data stream 3 with transponder 22C. Broadcast uploader 12 may be configured to upload each data stream to its associated transponder 22 for broadcast.

Headend 10 may also comprise de-mux units 18, cropping module 13, re-mux unit 14, broadband segment storage 16 and broadband transmitter 17. It will be appreciated that this configuration may be exemplary; some elements of headend 10, such as, for example, broadband storage 16 and/or broadband transmitter 17, may be alternatively be configured as part of an associated content distribution network (CDN) or cloud.

De-mux units 18 may be configured to de mux copies of the data streams (labeled as DS 1, 2 and 3) received from stream generator 11. It will be appreciated that each such data stream may include multiple services, not all of which may be necessary for recording programs. De mux units 18 may discard any unnecessary data packets and forward the de muxed streams (labeled as DS 1', 2' and 3') consisting of the remaining data packets to cropping module 13. As described hereinbelow, cropping module 13 may be configured to combine a selection of packets from each of the de muxed streams to generate a single stream (herein labeled as "cropped stream") of data packets from media assets defined as recording candidates; the selection may include a percentage of the packets from media assets deemed to be most likely to be recorded by the end user. The cropped stream may therefore represent a segmented broadcast of media assets for recording that may be input to re-mux unit 14. The remainder of the packets associated with the recording candidates may be forwarded as broadband data segments in any suitable format to broadband segment storage 16.

Re-mux unit, 14, may be configured to multiplex the received packets for broadcast over the air and send the resulting "recording stream" to broadcast uploader 12 for transmission to transponder 22D. It will be appreciated that the recording stream may ultimately be broadcast by transponder 22D in any suitable format such as, for example, DVB-TS, ES, or pure data over DVB. It will further be appreciated that the "cropped" media assets in the recording stream may be broadcast generally in parallel, i.e. at generally the same time, with the broadcast of their associated complete versions via transponders 22A-C. Broadband transmitter 17 may be configured to receive broadband segment data from broadband segment storage 16 for transmission as required via Internet 5.

STB 30 may comprise a multiplicity of tuners 31, recorder 33, tuned recording storage 34, player 35, broadband receiver 36 and broadband recording storage 37. In accordance with an exemplary embodiment of the present invention, STB 30 may comprise two tuners 31, it will, however, be appreciated that the present invention may also provide support for three or more tuners 31.

In accordance with some embodiments of the present invention, tuner 31A may be configurable to tune to recording transponder 22D, while tuner 31B may switch between transponders 22A, 22B and 22C as required per user selection of television channels. Recorder 33 may be configured to record programs from either one or both of tuners 31, saving the associated recorded data in tuned recording storage 34. Player 35 may access the recorded data in tuned recording storage 34 as necessary to play the recorded programs as per user request.

It will be appreciated that while the recording data from tuner 31B programs may represent complete, playable versions of the recorded programs. However, the recording data associated with the tuner 31A programs may represent incomplete versions that may require the program segments "cropped" by cropping module 13 for completion. Broadband receiver 36 may receive these program segments via a broadband connection and save them in broadband recording storage 37. Alternatively, broadband receiver 36 may forward the received program segments directly to player 35 to be played without intermediate storage.

Player 35 may be configured with known functionality for playing complete programs, for example, those recorded from tuner 31B. In accordance with some embodiments of the present invention, player 35 may also comprise assembly engine 50 which may be configured to assemble a complete playable program from the data received from both tuned recording storage 34 and broadband segment storage 16 via a broadband connection. It will be appreciated that the description of assembly engine 50 as an integral component of player 35 may be exemplary; the present invention may also support an external assembly engine 50 that may be invoked or accessed by player 35.

As described hereinabove, transponder 22D may be configured to broadcast a "cropped" data stream comprising a subset of the packets associated with each program broadcast. In accordance with an exemplary embodiment of the present invention, transponder 22D may have a bandwidth capacity of 40 mbps. Each SD channel on transponder 22D may be allocated 500 kbps, and each HD channel may be allocated 1.4 mbps. Assuming that the available bandwidth may be equally divided between SD an HD channels, transponder 22D may therefore provide approximately 42 channels ((21×0.5 mbps SD channels)+(21×1.4 mbps HD channels)=39.9 mbps) as opposed to the approximately 22 channels that may typically be provided by a 40 mbps transponder when similarly divided between SD an HD channels as described hereinabove.

Assuming that SD and HD channels may be so allocated, the required bandwidth for generally real time complementary downloads may be 700 kbps for SD and 1.1 mbps for HD. It will be appreciated that currently available broadband services may typically provide download bandwidth in excess of 1.1 mbps such that it may be expected that it may be feasible for system 100 to support real time broadband complementary downloads.

It will be appreciated that, as discussed hereinabove, the media assets broadcasted by transponder 22D may be incomplete versions that may not be immediately playable after recording. To generate a playable version it may be necessary to recombine a recorded incomplete version with its associated broadband data segments that were stored in broadband segment storage 16.

Depending on the configuration of system 100 and the timing of the user's request to recombine a recorded incomplete version with its associated broadband data segments, there may be a lag of several minutes before a complete version of the media asset may be generated. Therefore, in accordance with some embodiments of the present invention, the first x minutes of each program broadcast by transponder 22D may be broadcast in full; cropping module 13 may be configured to include a complete version of a program as it starts in the cropped stream forwarded to re-mux unit 14. For example, the first x minutes of an HD program may be allocated a full 2.5 mbps when broadcast by transponder 22D. It will be appreciated that an STB may typically be configured with a receiving buffer that may be employed to store the beginning of a program's broadcast. This may prevent time-shift or catch-up issues in case the viewer switches immediately to the recorded event.

It will further be appreciated that the operator of system may typically be expected to fully allocate the bandwidth of transponder 22D such that in order to allocate a full 2.5 mbps to the beginning of an HD media asset broadcast it may be necessary to temporarily reduce the bandwidth available for the other media assets being broadcast via transponder 22D. Alternatively, transponder 22D may be configured with a dedicated reserve bandwidth percentage to be allocated as needed to media assets at the beginning of their broadcasts.

Figure 2:
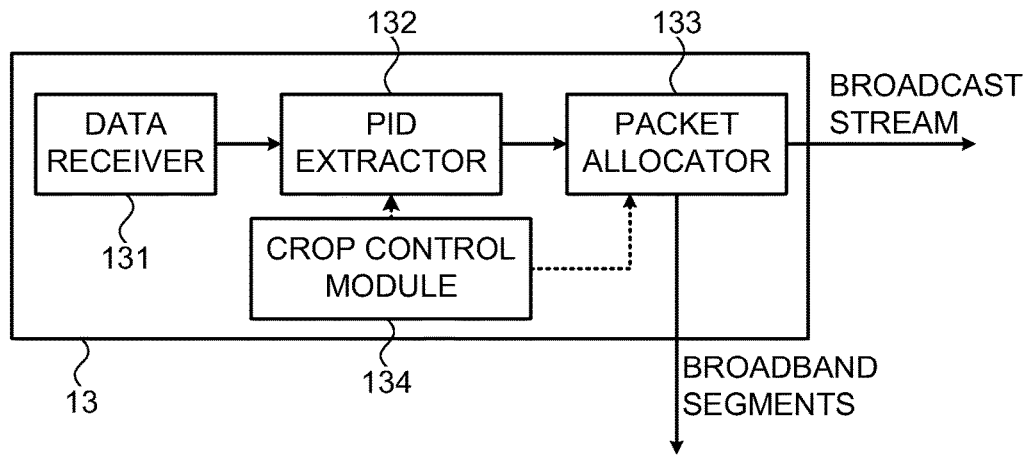
FIG. 2 is a schematic illustration of the cropping module of FIG. 1.

Reference is now made to FIG. 2 which illustrates the components of cropping module 13. Cropping module 13 may comprise data receiver 131, PID extractor 132, packet allocator 133 and crop control module 134. In operation, data receiver 131 may receive the de-muxed data streams from de-mux units 18 (FIG. 1), and forward them to PID (packet ID) extractor 132. PID extractor 132 may be configured to extract packets according to their PIDs as per settings received from crop control module 134. The settings may indicate which PIDs may be associated with media assets to be broadcast by transponder 22D (FIG. 1); packets associated with other media assets or services may be ignored.

The extracted packets may be forwarded to packet allocator 133. Packet allocator 133 may be configured to allocate a percentage of the incoming packets into a cropped broadcast stream for forwarding to re-mux unit 14 as discussed hereinabove. The remaining packets may be formatted in any suitable manner as program data segments to be stored in broadband segment storage 16 prior to broadband transmission as discussed hereinabove. As will be described hereinbelow, crop control module 134 may be configured to define the broadcast/broadband allocation ratios that may be used by packet allocator 133.

The program data segments may therefore be sections or blocks of data with a header that may represent excerpts of the media assets included in the data streams generated by stream generator 11 (FIG. 1) for broadcast via one or more of transponders 22A, 22B or 22C. Such segments may not be limited by length, size or standard. For example, a segment may be in the format of a DVB packet (typically 188 bytes), a GOP, or a 1-2 second segment of dynamic streaming (of 1-2 seconds). Any suitable format may be used for a segment; in fact, a segment may even include not necessarily playable data such as, for example, enhanced information. Similarly, the segments may be transcoded (with the exception of time domain transcoding) to reduce transmission bandwidth requirements.

Figure 3:
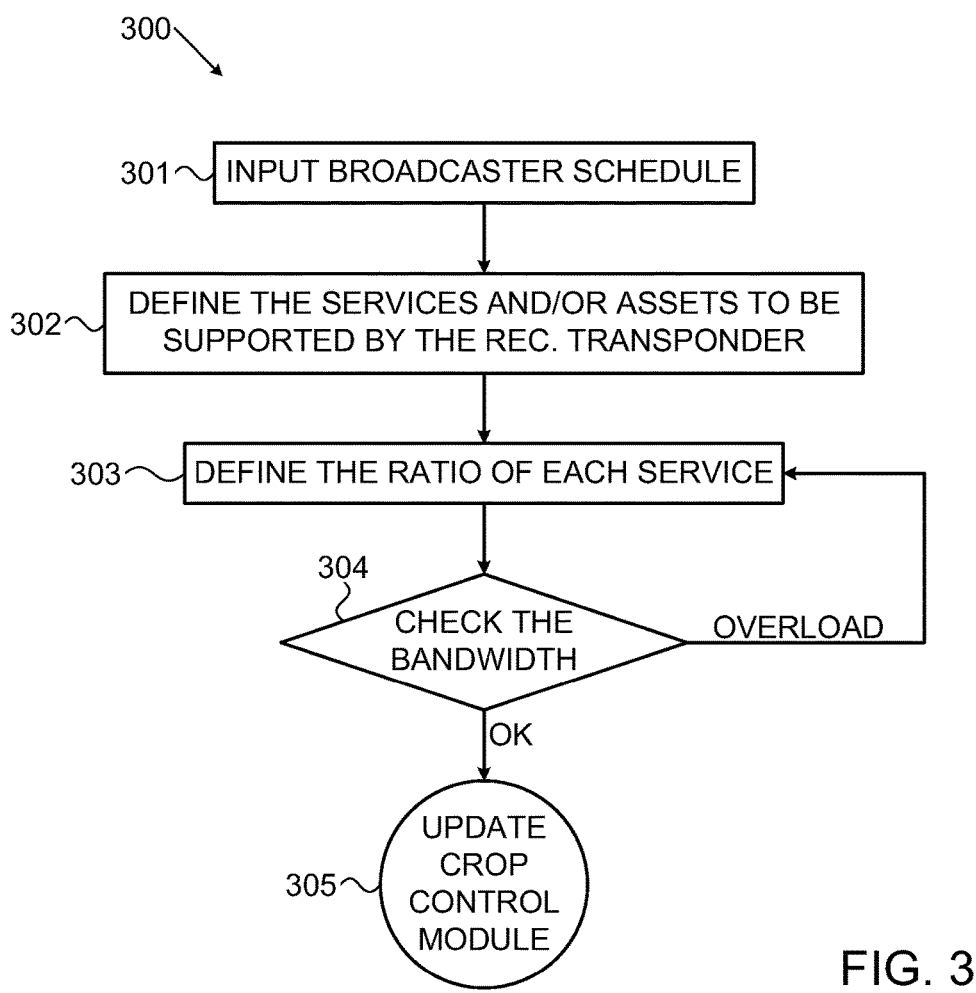
FIG. 3 is a block diagram of a novel delivery ratio determination process to be performed by the crop control module of FIG. 2.

Reference is now made to FIG. 3 which illustrates a delivery ratio determination process 300 that may be employed to calculate the settings for crop control module 134. The broadcast schedule may be input (step 301) with a list of scheduled media assets and services. The scheduled media assets and/or services to be broadcast on the dedicated "recording" transponder (e.g. transponder 22D) may be defined (step 302) by any suitable means. For example, a broadcaster may typically categorize media assets and services according to pricing bundles or categories. In such a case, all "premium" programs may be defined automatically. Alternatively, a specific media asset or service may be defined by manual input. For example, a 24/7 sports channel may be added during the World Cup to facilitate recording games played in a different time zone in the middle of the night. Media assets and services may also be defined by a statistical algorithm analyzing past usage.

A desired ratio may be defined (step 303) for each such defined media asset or service. Any suitable process or algorithm may be used to perform such definition. For example, a uniform ratio may be applied to each defined media asset or service. Prioritized ratios may also be applied depending on pricing bundles and/or categories. Manual input may also be employed to proactively adjust to defined ratios.

The overall required bandwidth (as per the results of step 303) may be checked (step 304) to ensure that it does not exceed the bandwidth available on the recording transponder. Steps 303 and 304 may be performed iteratively until the ratio definitions are finalized and validated by step 304. The settings in crop control module 134 may be updated (step 305) with the defined ratios per the selected media assets and services. It will be appreciated that the logic of process 300 may be incorporated within crop control module 134. Alternatively, process 300 may be an external process that may communicate with crop control module 134.

In accordance with some embodiments of the present invention, assembly engine 50 (FIG. 1) may assemble the recorded media asset or service according to program clock references (PCRs) included in the data received via both broadcast and broadband. PCRs are timestamps that may be associated with specific assets or services to synchronize the demultiplexing of data streams.

Figure 4:
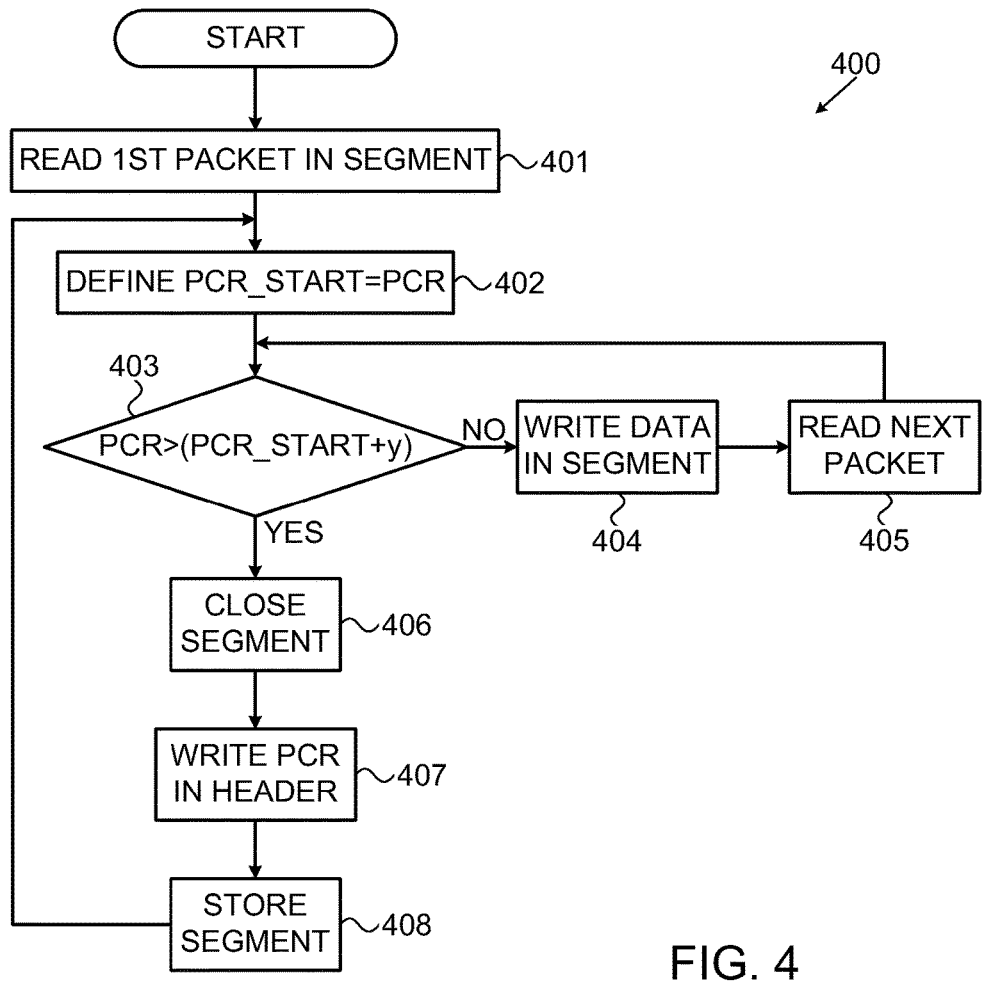
FIG. 4a is a block diagram of a novel data segmentation process to be performed by the packet allocator of FIG. 2.

Reference is now made to FIG. 4 which illustrates a data segmentation process 400 according to which packet allocator 133 may leverage the PCRs from the original data streams produced by stream generator 11 to generate and label the program data segments to be transmitted via broadband.

Packet allocator 133 may read (step 401) a first packet and define (step 402) "PCR_Start" as the value of the packet's PCR. The PCR is then compared (step 403) to (PCR_Start+ "y"), where y is the target length of the segment minus "w", and w is an integer smaller than target length/2. If the result of step 403 is no, packet allocator 133 may write (step 404) the data from the packet in the segment and may read (step 405) the next packet before returning to step 403.

When the result of step 403 is yes, packet allocator 133 may close (step 406) the segment and write (step 407) the current PCR in its header before storing (step 408) the segment in broadband segment storage 16. The process may then return to step 402 to begin generating the next segment with the already read packet. Process 400 may therefore facilitate a consistent use of PCR timestamps by the associated broadcast and broadband delivery vehicles for a single media asset or service, thereby enabling assembly engine to identify the "missing" packets from the broadcast data stream and replace them from the broadband data stream.

It will be appreciated that process 400 may include other logic as necessary to differentiate between packets associated with different media assets or services; a segment may not include data from more than a single media asset or service. Furthermore, all related data segments (i.e. those associated with a single media asset) may be stored serially according to PCR in a single logical or physical file in broadband segment storage 16.

Figure 5:
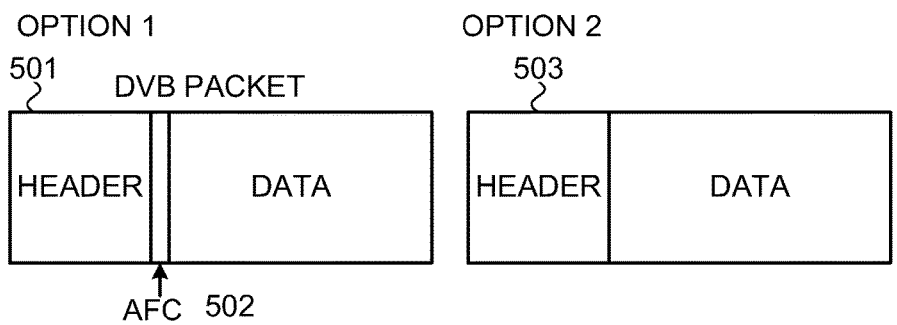
FIG. 5 is a schematic illustration of two alternative options for implementing the embodiment of FIG. 1.

Reference is now made to FIG. 5 which illustrates two alternative options for informing STB 30 about the existence of the recording transponder (e.g. transponder 22D in the embodiment of FIG. 1) along with some other information that may be required, such as, for example, transponder information and packet IDs. In option 1, the DVB adaptation field is used to include information inside the data stream. For example, AFC=1 may indicate that the media asset or service may be available on the recording transponder. Alternatively, as illustrated in option 2, the recording transponder information may be included in the NIT, PMT and SI information of the broadcast stream.

Figure 6:
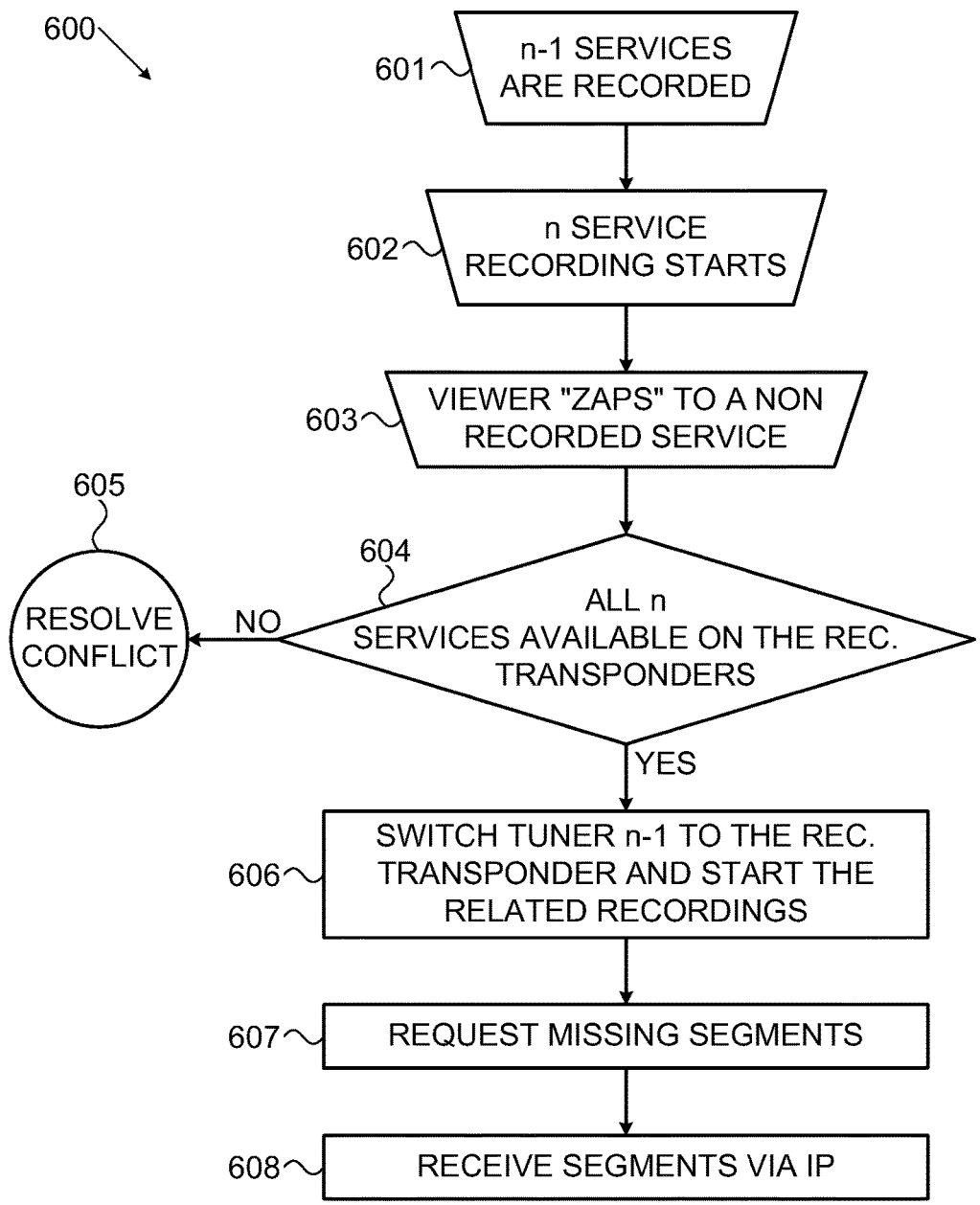
FIG. 6 is a block diagram of a typical operating flow for an STB, constructed and operative in accordance with some embodiments of the present invention.

Reference is now made to FIG. 6 which illustrates a typical operating flow 600 for an STB 30, constructed and operative in accordance with some embodiments of the present invention. In the interests of clarity, STB 30 may be assumed to comprise two tuners 31 as in the embodiment of FIG. 1. It will, however, be appreciated that the present invention may support three, four, or even greater numbers of tuners 31 as well. It will similarly be appreciated that STB 30 may be configured with a wideband tuner that may provide generally the same functionality as multiple physical tuners.

Step 601 may represent a typical state where n−1 tuning services may be in process, where "n" may represent the number of tuners 31 in an exemplary STB 30. For example, if STB 30 may be configured with two tuners 31 as depicted in FIG. 1, one tuner 31 (e.g. tuner 31A) may be tuned to record as per a viewer request or as a scheduled operation. When the $n^{th}$ tuner 31 may start recording (step 602) in response to an additional tuning service request, both tuners 31 may be "busy", actively engaged in receiving a broadcast.

While both tuners are busy recording, a viewer may zap (step 603) between services to access a different media asset or service (e.g. one that is not already being recorded by one of the two tuners 31), thereby effectively requesting a cumulative total of n+1 tuner services. STB 30 may check (step 604) whether both of the services being recorded are available from recording transponder 22D. If both services are not available from recording transponder 22D, STB 30 may attempt to resolve (step 605) the conflict, typically by prompting the user to either maintain both of the recordings or to stop one of them to free up a tuner 31.

However, if both services are available on recording transponder 22D, tuner 31A may be tuned (step 606) to recording transponder 22D and start recording both services, thus freeing tuner 31B to provide the non-recording service requested by the viewer. STB 30 may request the "missing" segments, (e.g. those that do not exist in the broadcast from transponder 22D), from headend 10. STB 30 may then receive (step 608) the segments from headend 10 via an IP connection.

It will be appreciated that the timing of step 608 may be configurable. For example, STB 30 may receive the broadband segments in real time while recorder 33 may be recording the services received via transponder 22D. Alternatively, headend 10 may provide the segments at a later time, presumably, although not necessarily, during an off peak traffic period, when bandwidth resources may generally be in less demand.

Headend 10 may even be configured to transmit the segments on demand when player 35 is invoked to play the recording. Delaying the transmission in such manner may naturally spread out the broadband transmissions over time to prevent traffic congestion. Furthermore, since some recordings are never played by the user, it may serve to conserve bandwidth that would otherwise be "wasted" on transmissions from which no benefit may be derived. The broadband data segments stored in broadband segment storage 16 may be deleted after receipt by broadband receiver 36. System 100 may also be configurable to delete the broadband data segments if they are not requested within a definable period of time.

Figure 7:
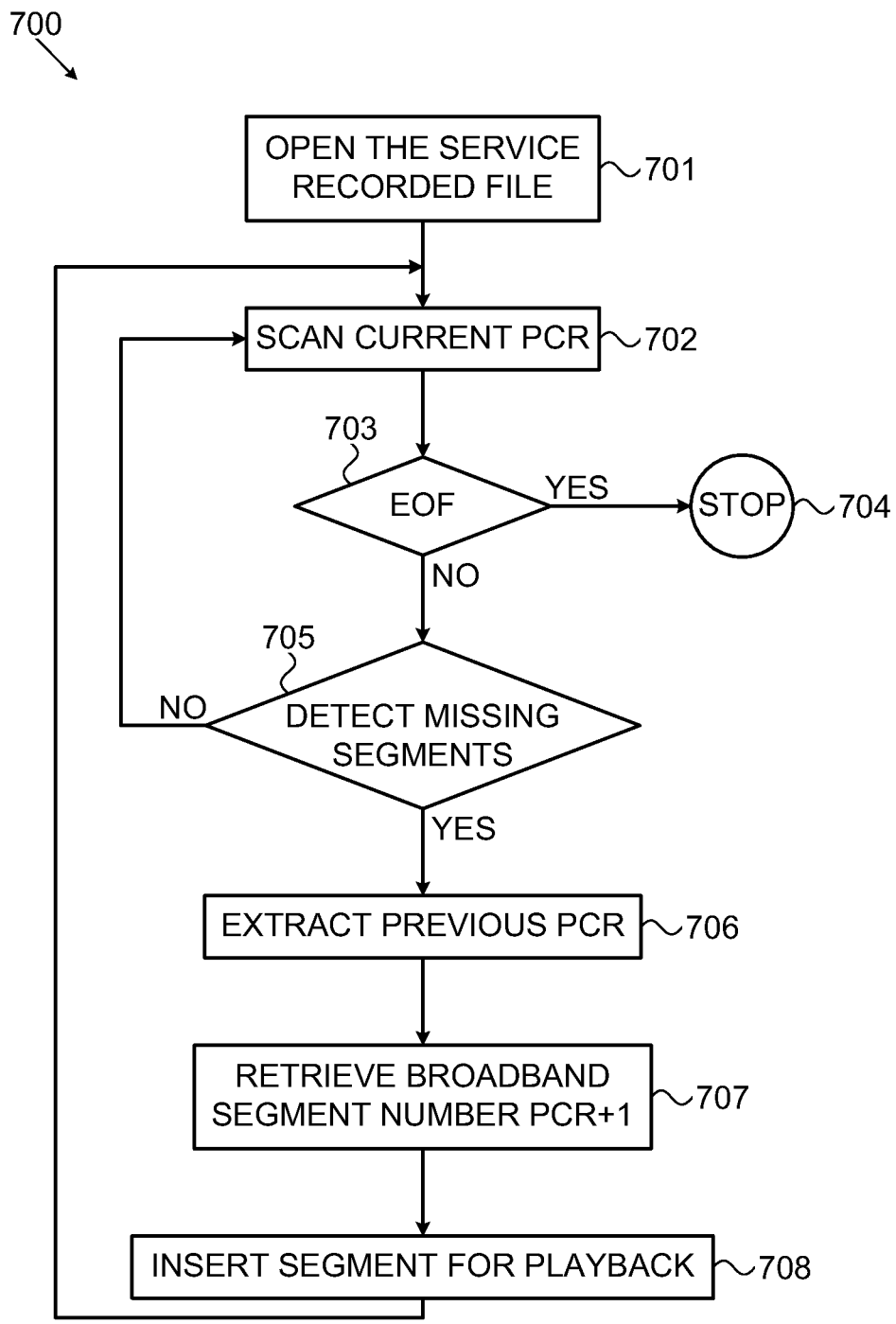
FIG. 7 is a block diagram of a novel recording assembly process, constructed and operative in accordance with some embodiments of the present invention.

Reference is now made to FIG. 7 which illustrates a novel recording assembly process 700 that may be employed by assembly engine 50 to reassemble a media asset or service partially recorded via recording transponder 22D. Upon a request for playback of the recording, assembly engine 50 may open (step 701) the associated recording stored in tuned recording storage 34.

Assembly engine 50 may scan (step 702) the PCR of the current data segment. If (step 703) an 'end of file' condition is detected, the process may end (step 704). Assembly engine 50 may detect (step 705) "missing" packets using the formula: PCR Gap>y, where "y" may be equal to the target length of a segment minus "w", and w is an integer smaller than target length/2 as discussed hereinabove with respect to the embodiment of FIG. 4.

It will be appreciated that there may not be a constant distance between PCRs in DVB—only the maximum duration between PCRs may be defined. Accordingly, if the gap between PCRs exceeds y, assembly engine may extract (step 706) the previous PCR read. Assembly engine 50 may use the extracted value to retrieve (step 707) the "missing" segment from the broadband data segments generated by cropping module 13 (as discussed hereinabove with respect to the embodiment of FIG. 2), identifying the retrieved segment as PCR=Extracted_PCR+1. The retrieved segment may then be inserted in the playback stream after the previous segment (as defined by the extracted PCR).

Control may then return to step 702 and loop continuously until EOF (step 703). It will be appreciated that following the insertion of a broadband data segment in step 707, the previous PCR for step 707 may be the PCR of the inserted segment. Similarly, if the previous iteration of step 705 yields a "no" result, then the previous PCR may be from the previous result of step 702; i.e. from the previous segment from the broadcast recording.

It will be appreciated that the present invention may support several options for implementing the retrieval of the broadband data segments in step 707. For example, STB 30 may open an IP session with headend 10 in response to an actual request to play the recording. In such a case, broadband transmitter 17 may stream the relevant broadband data segments file directly to assembly engine 50 via the Internet and broadband receiver 36 without intermediate storage in broadband recording storage 37. Alternatively, broadband transmitter 17 may transmit the data segments file in parallel with the initial broadcast via transponder 22D. The data segments file may then be stored in broadband recording storage 37 until required by assembly engine 50. System 100 may also be configured such that broadband transmitter 17 may transmit the data segments according to a schedule some time after the original broadcast such that the data segments may generally, but not necessarily always, be stored in broadband recording storage 37 prior to the execution of process 700. System 100 may also be configured to broadcast the broadband data segments to STB 30 via any of transponders 22 during off peak hours when there may be available bandwidth in one or more of transponders 22.

It will further be appreciated that process 700 may be scheduled for execution without requiring a proactive user request to play the recording. For example, assembly engine 50 may be configured to assemble a complete version of the recorded media asset during off peak hours when broadband usage may be lower and/or STB 30 may not normally be in active use by the user. In such a case, the complete recording may be stored in tuned recording storage 34 for later use without requiring assembly at or near the time that a playback may be requested by the user.

Figure 8:
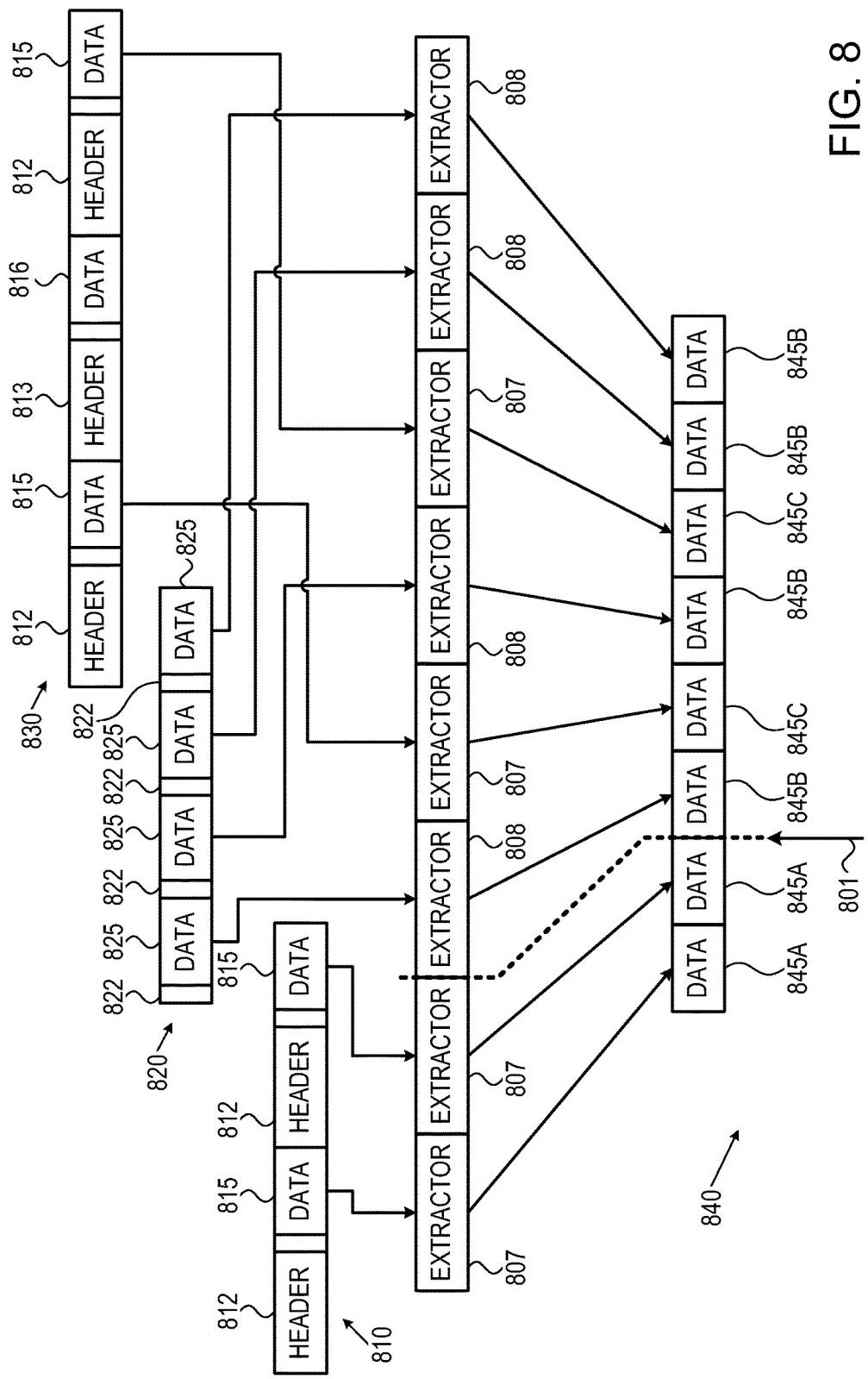
FIG. 8 is a schematic illustration of an exemplary flow of data for a media asset recorded and reassembled according to the embodiments of FIGS. 6 and 7.

Reference is now made to FIG. 8 which illustrates an exemplary flow of data for a media asset recorded and reassembled according to the embodiments of FIGS. 6 and 7. Broadcast data stream 810 may represent a typical broadcast data stream for viewing and/or recording by users of STB 30, such as, for example, data stream 1, 2 or 3 broadcast by transponders 22A, 22B or 22C as in the embodiment of FIG. 1. Broadcast data stream 830 may represent a broadcast recording data stream such as that broadcast by transponder 22D. Broadband data stream 820 may represent a transmission of data segments such as, for example, that transmitted by broadband transmitter 17. Media asset data repository 840 may represent the data associated with a given recorded media asset as it may be saved in order of playback. Extractors 807 and 808 may represent functional modules used by STB to extract relevant data from data streams 810, 820 and/or 830 when playing and/or recording a media asset.

Broadcast data streams 810 and 830 may comprise data packets with headers 812 and 813 corresponding to data 815 and 816, respectively. Headers 812 and 813 may provide a variety of parameters that may related to the broadcast, including, for example, information which may be used to identify the media assets associated with data 815 and 816 and indicate the order in which they should be played when broadcast and/or recorded.

As per the example depicted in FIG. 8, the user of STB 30 may initially record a media asset from data stream 810. As part of the recording process, extractors 807 may extract data 815 from data stream 810 based on the information in headers 812, and copy data 815 as data 845A into media asset data repository 840. It will be appreciated that repository 840 may be any suitable functionality for storing a media asset as it may be played and/or recorded such as, for example, a playback/recording buffer or a more persistent type of storage.

It will also be appreciated that the depiction of data stream 810 as comprising only two data packets may be exemplary; in operation data stream 810 may comprise a continuous stream of data packets. It will similarly be appreciated that data stream 810 may also comprise data packets from other media assets that may be ignored, i.e. not recorded; in the interests of clarity these ignored data packets are not depicted in FIG. 8. Furthermore, the order in which data 815 may be transmitted in data stream 810 may not necessarily correspond with the order in which it may be saved in repository 840; extractor 807 may order data 845A in repository 840 in accordance with counter or PCRs read from associated headers 807.

As discussed hereinabove with respect to FIG. 6, during the recording process it may be necessary to switch from recording broadcast data stream 810 to recording data stream 830. Line 801 may indicate the point at which such a switch may be necessary. From that point onwards, it may ultimately be necessary to reassemble the media asset from both data streams 820 and 830.

It will be appreciated that the data provided by broadband data stream 820 and broadcast data stream 830 may be in different formats. Broadcast data stream 830 may be in generally the same format as broadcast data stream 810, typically, although not necessarily in DVB format. In contrast, broadband data stream 820 may be file or segment based. Furthermore, the data segments in broadband data stream 820 may not be limited to encapsulated versions of the data packets in broadcast data streams 810 and 830; broadband data stream 820 may also include transcoded versions of a media asset's data, i.e., the same content in different bitrate or resolution. In accordance with some embodiments of the present invention headend 10 may also deliver different versions of segments to different playback devices depending on the playback device's available bandwidth.

Data 825 from broadband data stream 820 may be extracted by extractors 808 and copied into repository 840 as data 845B. Extractors 808 may be functionally similar to extractors 807. However, it will be appreciated that since, as discussed hereinabove, data 815 and 825 may be provided in different formats, the technical configuration of extractors 807 and 808 may be different. For example, data 825 may be received in packets of different sizes; i.e. while DVB packets in an exemplary broadcast data stream 810 may be limited to 188 bytes, the data in broadband data stream 810 may not be similarly limited. For example, broadband data stream 810 may have a playback duration limitation/duration, for example 1 second of video playback. In such a case the 'actual size' of a data packet may be based on the bitrate and data NALs that may be included. Accordingly, each data packet in broadband data stream 820 may include a header 822 that "presents" such information to extractor 808 which may then remove header 22 and place data 825 in its position in repository 840 as data 845B.

It will be appreciated that data 815 from broadcast data stream 830 may be formatted in the same manner as data 815 from broadcast data stream 810. Accordingly, extractors 807 may extract data 815 from broadcast data stream 830 and copy them into repository 840 as data 845C in generally the same manner as data 815 may be extracted from broadcast data stream 810. It will be appreciated that as indicated by header 813, data 816 may not be related to the media asset being recorded and accordingly may not be copied into repository 840.

Data 845 A, B and C as copied into repository 840 may jointly represent a complete version of the recorded media asset. It will be appreciated, however, that such a complete version may not be immediately available after or during the initial broadcast of the asset. As discussed hereinabove, broadband data stream 820 may not be received in parallel with broadcast data stream 830 and there may also be a delay while assembly engine 50 assembles the complete version using extractors 807 and 808 and/or any other suitable functionality.

Figure 9A:
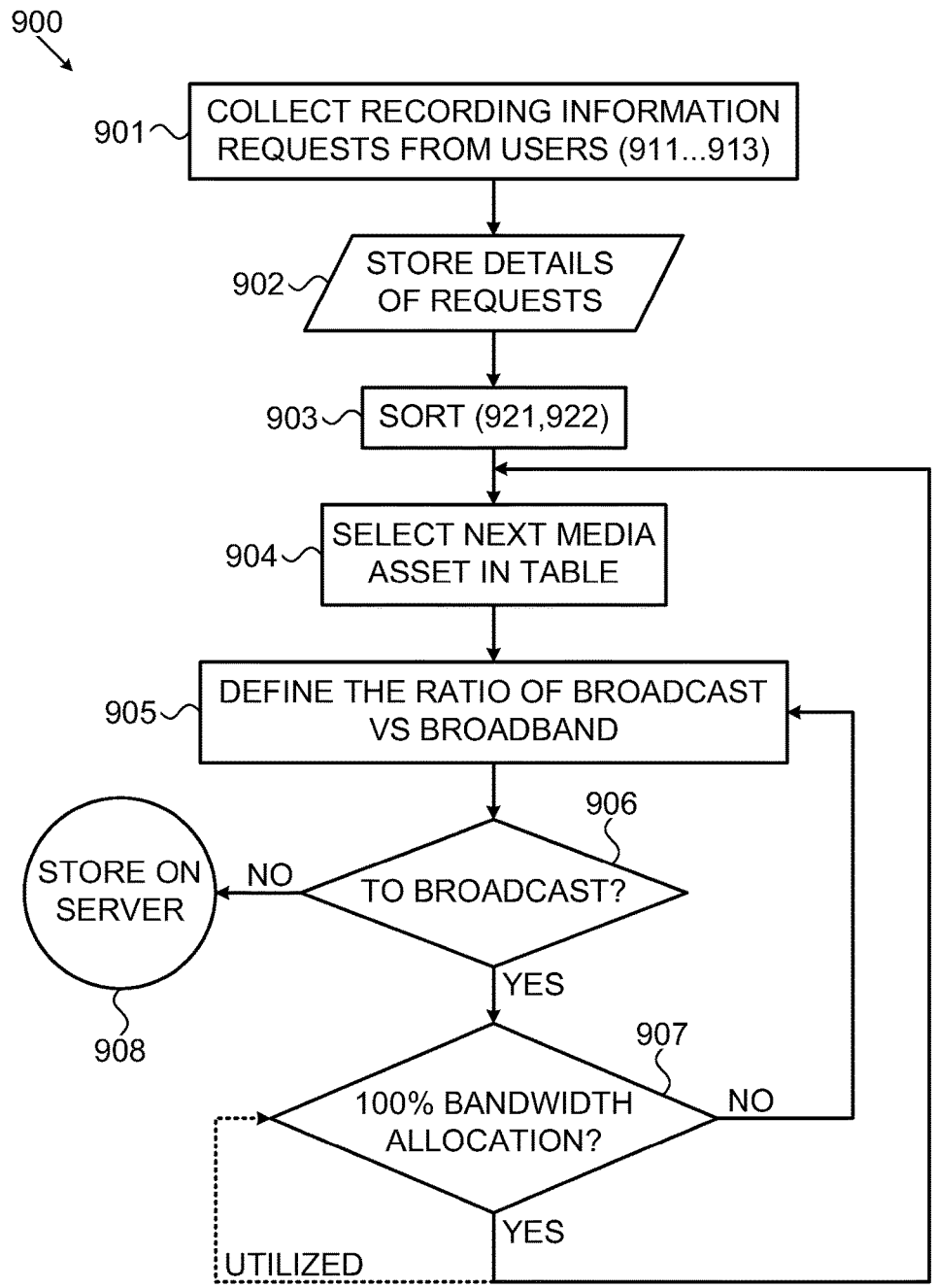
FIG. 9A is a block diagram of a novel "consumer recording feedback" policy, constructed and operative in accordance with some embodiments of the present invention.
Figure 9B:
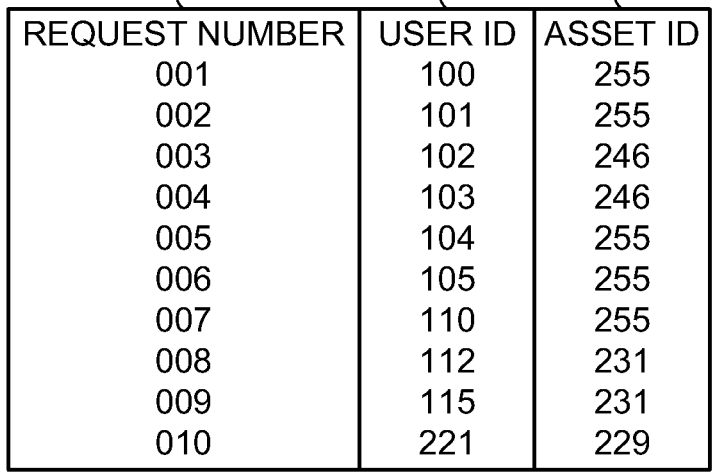
FIG. 9B is a schematic illustration of exemplary tables to be used by the process of FIG. 9A.
Figure 9B:
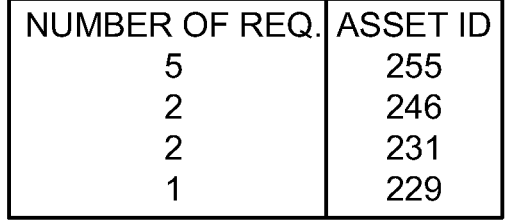

Reference is now made to FIG. 9A, which illustrates a "consumer recording feedback" policy 900 that may be used by crop control module 15 to calculate settings for broadcast/broadband ratios as a function of user recording requests. Reference is also made to FIG. 9B which illustrates exemplary tables that may be used by the process of FIG. 9A.

Crop control module 15 may collect (step 901) predefined recording requests from users of system 100 and store (step 902) the request details in recording requests table 910. The requests may contain, for example, request numbers 911, user IDs 912 and asset IDs 913. Other information may also be stored as required, including, for example, broadcast scheduling information.

Module 15 may sort (step 903) the data from table 910, for example, according to the number of requests for each asset ID 913 to yield sorted request table 920 which may include, for example, the number of requests 921 for each asset ID 922. Module 15 may select (step 904) the next media asset in table 920 according to number of requests 921. For example, for the first execution of step 904, the selected media asset may be associated with the asset ID 922 with the highest number of requests 921.

Module 15 may define (step 905) a broadcast/broadband ratio for the selected media asset. For example, the ratio may be a function of the proportion of the associated number of requests 921 to the sum of all number of requests 921 in table 920. Other factors may affect the ratio. For example, a minimum and/or maximum ratio may be defined for any relevant media asset, i.e. a media asset with a value of at least one number of requests 921.

As discussed hereinabove in the context of FIGS. 2 and 3, the defined ratio may be used to determine (step 906) the percentage of data segments to be flagged for inclusion in a "recording" broadcast data stream, with the remaining data segments forwarded to broadband segment storage 16. Crop control module 15 may also check (step 907) the total bandwidth allocated on a continuous basis to prevent under/over allocation. If the allocation is not considered full, control may return to step 905 to refine the allocation. If there is full bandwidth allocation, the process may return to step 904 to select the next media asset in table 920 for processing. This process may continue iteratively until the entire table 920 may be processed.

Alternatively, a "proportional distribution" policy may be used by module 15 to calculate broadcast/broadband ratios as a function of each media asset's popularity distribution among viewers. Instead of recording requests, audience measurement system (AMS) statistics may be received and analyzed by module 15 to prioritize and allocate broadcast bandwidth for each media asset to be broadcast via transponder 22D. It will be appreciated that the present invention may support any suitable generally available source or algorithm for compiling such statistics.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to STB 30 in electronic form, over a network, for example. Alternatively or additionally, the software may be stored in tangible, non-transitory computer-readable storage media, such as optical, magnetic, or electronic memory.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A method for facilitating multiple recordings via a single tuner, the method comprising:
   isolating data packets as isolated data packets associated with recording candidate media assets from at least two broadcast data streams;
   assigning a broadcast/broadband ratio to each of said recording candidate media assets, wherein each said broadcast/broadband ratio indicates a percentage of said isolated data packets from an associated recording candidate media asset to be included in an associated broadcast data stream from among said at least two broadcast data streams, and wherein at least one of said broadcast/broadband ratios is defined as an initial broadcast/broadband ratio of 100%;
   generating at least one broadcast recording data stream from a subset of said isolated data packets in accordance with an associated said broadcast/broadband ratio;
   broadcasting said at least one broadcast recording data stream in parallel with said at least two broadcast data streams, wherein said broadcast recording data stream is broadcast via at least one dedicated broadcast for recording device, and said at least two broadcast data streams are broadcast via other broadcast devices;
   storing remaining data packets not included in said isolated data packets in broadband data segments;
   transmitting said broadband data segments via an IP connection to facilitate reassembly of partially recorded said media assets, wherein said partially recorded media assets were recorded from said broadcast recording stream; and
   redefining said initial broadcast/broadband ratio with a lower value after an initial portion of its said associated recording candidate media asset has been included in said broadcast recording data stream.

2. The method according to claim 1 wherein said broadcast/broadband ratios are at least one of uniform, prioritized and subject to manual input.

3. The method according to claim 1 wherein said assigning comprises:
   accommodating said initial broadcast/broadband ratio by temporarily assigning lower said broadcast/broadband ratios for other said recording candidate media assets included in said broadcast recording data stream until after said initial portion is complete.

4. The method according to claim 1 wherein said assigning comprises:
   accommodating said initial broadcast/broadband ratio by allocating dedicated bandwidth for broadcasting said initial portion.

5. The method according to claim 1 wherein said broadband data segments are stored in a different format than said broadcast data streams.

6. The method according to claim 1 wherein said assigning comprises:
   defining allocation ratios for said subset of packets and said remaining packets in accordance with at least one of: consumer recording requests and proportional distribution.

7. The method according to claim 1 wherein said dedicated broadcast for recording device is a satellite transponder.

8. The method according to claim 1 wherein said dedicated broadcast for recording device is a cable frequency transmitter.

9. A broadcast headend comprising:
   a data stream generator to generate a multiplicity of data streams for broadcast;
   a cropping module to crop at least two of said multiplicity of data streams to generate at least a cropped broadcast stream and broadband data segments, wherein said cropped broadcast stream includes a subset of packets associated with at least two recording candidate media assets in said multiplicity of data streams, and said broadband data segments represent remaining packets associated with said recording candidate media assets and not included in said subset of packets;
   a crop control module to at least define allocation ratios for said subset of packets and said remaining packets in accordance with at least one of: consumer recording requests and proportional distribution;
   a broadcast uploader to upload at least said multiplicity of data streams and cropped broadcast stream to a broadcast satellite, wherein said cropped broadcast stream is uploaded to a dedicated broadcast for recording device for broadcast as a broadcast recording stream; and
   a broadband transmitter to transmit said broadband data segments via an IP connection to a recording device configured to record packets associated with at least one of said recording candidate media assets in said broadcast recording stream, wherein said transmitted broadband data segments are associated with said at least one of said recording candidate media assets.

10. The broadcast headend according to claim 9 and also comprising a broadband data segment storage unit to store said broadband data segments prior to transmission by said broadband transmitter, wherein said broadband data segment storage unit is configurable to store said broadband data segments in a different format than said data streams.

11. The broadcast headend according to claim 9 wherein said dedicated broadcast for recording device is a satellite transponder.

12. The broadcast headend according to claim 9 wherein said dedicated broadcast for recording device is a cable frequency transmitter.

13. The broadcast headend according to claim 9 wherein said crop control module is further configured:
   to define at least one of said allocation ratios as an initial broadcast/broadband ratio of 100%; and
   to redefine said initial broadcast/broadband ratio with a lower value after an initial portion of its said associated recording candidate media asset has been included in said broadcast recording stream.

* * * * *